United States Patent

Bridge et al.

[19]

[11] Patent Number: 6,125,368
[45] Date of Patent: Sep. 26, 2000

[54] FAULT-TOLERANT TIMESTAMP GENERATION FOR MULTI-NODE PARALLEL DATABASES

[75] Inventors: William Bridge, Alameda; Madhusudan Krishnapuram, Mountain View; J. William Lee, Foster City; Juan R. Loaiza, San Carlos, all of Calif.

[73] Assignee: Oracle Corporation, Redwood Shores, Calif.

[21] Appl. No.: 08/808,582

[22] Filed: Feb. 28, 1997

[51] Int. Cl.$^7$ .................................................. G06F 17/30
[52] U.S. Cl. ............................................ 707/201; 707/202
[58] Field of Search .................................... 707/10, 8, 201, 707/202; 370/473; 375/354

[56] References Cited

U.S. PATENT DOCUMENTS

| | | | |
|---|---|---|---|
| 4,507,751 | 3/1985 | Gawlick et al. | 364/900 |
| 4,584,643 | 4/1986 | Halpern et al. | 364/200 |
| 4,894,846 | 1/1990 | Fine | 375/107 |
| 5,001,730 | 3/1991 | Franaszek et al. | 375/107 |
| 5,155,678 | 10/1992 | Fukumoto et al. | 395/425 |
| 5,269,020 | 12/1993 | Kakimoto | 395/600 |
| 5,278,982 | 1/1994 | Daniels et al. | 395/600 |
| 5,280,611 | 1/1994 | Mohan et al. | 395/600 |
| 5,428,645 | 6/1995 | Dolev et al. | 375/354 |
| 5,471,614 | 11/1995 | Kakimoto | 395/650 |
| 5,511,188 | 4/1996 | Pascucci et al. | 395/600 |
| 5,550,873 | 8/1996 | Dolev et al. | 375/354 |
| 5,561,795 | 10/1996 | Sarkar | 395/600 |
| 5,566,180 | 10/1996 | Eldson et al. | 370/94.2 |
| 5,613,113 | 3/1997 | Goldring | 395/618 |
| 5,689,688 | 11/1997 | Strong et al. | 395/553 |
| 5,710,922 | 1/1998 | Alley et al. | 395/617 |
| 5,737,600 | 4/1998 | Geiner et al. | 395/616 |
| 5,778,387 | 7/1998 | Wilkerson et al. | 707/202 |
| 5,784,421 | 7/1998 | Dolev et al. | 375/354 |
| 5,822,381 | 10/1998 | Parry et al. | 325/356 |
| 5,870,441 | 2/1999 | Cotton et al. | 375/354 |

OTHER PUBLICATIONS

Li "Distributed Source–Destination Synchronization Using Inband Clock Distribution" IEEE Journal on Selected Areas in Communications, vol. 14, No. 1, pp. 153–161, Jan. 1996.

Sens "The Performance of Independent Checkpointing in Distributed Systems" Proceedings of the 28th Annual Hawaii International Conference on System Sciences, pp. 525–533, May 1995.

Abali et al. "Time Synchronization on SP1 and SP2 Parallel Systems" IEEE Transactions on Parallel and Distributed Systems, vol. 4, No. 3, pp. 666–672, Mar. 1993.

Vervoort et al, "Distributed Time–Management in Transputer Networks" IEEE, pp. 224–230, Jan. 1991.

Comer et al. "High–Speed Propogation of Link Status Routing Control Information" IEEE, pp. 190–194, May 1990.

Lamport, Leslie, "Time, Clocks, and the Ordering of Events in a Distributed System", Operating Systems, Communications of the ACM, Jul. 1978, vol. 21, No. 7, pp. 558–565, ACM 0001–0782/78/0700–0558.

Li, Chung–Sheng and Ofek, Yoram, "Distributed Source–Destination Synchronization Using Inband Clock Distribution," IEEE Journal on Selected Areas in Communications, vol. 14, No. 1, Jan. 1996.

(List continued on next page.)

*Primary Examiner*—Paul V. Kulik
*Attorney, Agent, or Firm*—McDermott, Will & Emery

[57] ABSTRACT

Every node in a multi-node parallel database system maintains a logical clock for generating timestamps. The logical clocks are synchronized by attaching a current timestamp to every message that is sent by a node. When a node receives an incoming timestamp that is greater than the value indicated by the associated logical clock, it sets the associated logical clock forward to at least the value of the timestamp. Each node continually sends and receives a message including a timestamp at least once in a prescribed period of time. Moreover, each node maintains a high watermark that represents a time greater or equal to the highest time of any logical clock in the multi-node parallel database system.

22 Claims, 6 Drawing Sheets

OTHER PUBLICATIONS

Sens, Pierre, "The Performance of Independent Checkpointing in Distributed Systems," Proceedings of the 28$^{th}$ Annual Hawaii International Conference on System Sciences–1995.

Abali, Bulent and Stunkel, Craig B., "Time Synchronization on SP1 and SP2 Parallel Systems," IBM Thomas J. Watson Research Center, N.Y., 1995.

Vervoort, W.A., teWest, R., Schoute, A.L. and Hofstede, J., "Distributed Time–Management in Transputer Networks," Department of Computer Science, University of Twente, The Netherlands, 1991.

Comer, Douglas E. and Yavatkar, Raji, "High–Speed Propagation of Link Status Routing Control Information," Department of Computer Science at Purdue University and the University of Kentucky, 1990.

FAULT-TOLERANT TIMESTAMP GENERATION FOR MULTI-NODE PARALLEL DATABASES

FIELD OF THE INVENTION

The present invention relates to database systems, and more specifically to mechanisms for assigning a sequence to events that occur within multi-node parallel database systems.

BACKGROUND OF THE INVENTION

A parallel database is a database that runs on more than one CPU (central processing unit). There are two kinds of parallel database systems: one kind is a single-node parallel database, which runs on a single symmetric multiprocessor (SMP). On an SMP, all CPUs share memory and disk. Another kind of parallel database system is a multi-node parallel database. Multi-node parallel databases run on a multiple number of nodes that do not share memory. Each node in the multi-node parallel database system can be an SMP or a single CPU. Unlike distributed databases, both single-node and multi-node parallel databases provide a single database image.

Single-node parallel databases typically scale to the number of CPUs supported by a single SMP machine. Today, these kinds of databases are widely used and supported by many vendors. SMPs generally can support up to a few dozen CPUs because of the limited capacity on a single SMP bus.

Multi-node parallel databases are more fault-tolerant. If one node dies, surviving nodes can keep the database available. Multi-node parallel databases are more scalable because the number of CPUs are not subject the limitation of a single SMP bus. Achieving better scalability in multi-node parallel database systems is a challenge, however, because sending messages between nodes is more expensive than referencing shared memory on an SMP machine.

One of the difficulties is generating timestamps to order events within a multi-node parallel database. A multi-node parallel database uses timestamps to track the sequence of changes made by different nodes to shared resources. For example, if two transactions change a common dictionary, the transaction with the more recent timestamp is the change that occurred after the change of a transaction with a less recent timestamp. During normal processing, the ordering of events is used to maintain consistency. During recovery time, the ordering is used to order redo records in a recovery log.

The problem of tracking the sequence of completed transactions is generally solved by marking every completed transaction with a consistently increasing serial number at the time the transaction completes. Later transactions will have serial numbers greater than earlier transactions, allowing transactions to be well-ordered. These serial numbers are often called timestamps, because they indicate when an event occurred within a computer system relative to other events.

Using a hardware clock for each node to generate these timestamps for each node, however, is problematic because physical devices are imperfect. Each local clock may be set to a different time, and some clocks may run faster than others. It is quite possible for the clock of one node to be running fast, and, as a result, its timestamps would have a greater value than those of another clock, even though the timestamps of the other clock were generated at the same physical time.

One way to avoid the problem of synchronizing the local clocks is to use a single global, hardware clock connected to every node in the multi-node parallel database system. However, in a database with many nodes, a single hardware clock requires custom-built hardware, adds cost, and limits the scalability of the entire system. Furthermore, many hardware systems today do not have such a global clock.

Another approach is to recognize that all the nodes in a multi-node parallel database system already communicate with one another by sending messages over the network. Thus, one node, called a global clock service, can be assigned the task of running a clock. When other nodes need a timestamp, the other nodes send a message to the global clock service, requesting a timestamp. Upon receipt of such messages, the global clock service would generate a timestamp, either by reading its hardware clock or, more easily, by incrementing a software-based serial number counter, and send the timestamp to the requester.

This approach works and is in common use, but it does have a substantial drawback. As the system gets larger, more nodes must communicate with the global clock server. As a result, more time is spent waiting for the global clock server to handle all the requests. Certain improvements to the global clock server approach can be made. However, the basic design is ultimately limited by the single global point of timestamp generation, which can become a performance bottleneck for the entire system.

A method to improve the performance of timestamp generation by avoiding the single point has been discussed in a classic article by L. Lamport, "Time, Clocks & the Ordering of Events in a Distributed System", 21 COMMUNICATIONS OF THE A.C.M. 558 (July 1978), incorporated herein by reference. In general, Lamport discloses a way to generate timestamps using a local clock, such as a local software-based counter, yet remain synchronized. According to Lamport's technique, every message sent between nodes bears a timestamp that indicates the current time of a local clock. When a node receives a "piggybacked" timestamp from another node which is running fast, the node receiving the timestamp would resynchronize its local clock forward to the faster time. This procedure ensures a partial ordering upon the distributed system. That is, all causes will have a lower timestamp than their effects. This is true because each transaction carries with it the most recent timestamp it has seen so far. By the time the timestamp is generated for the completed transaction, the timestamp will have a greater value than any of the prior transactions in the chain of messages.

In a distributed system that uses Lamport's method of synchronizing clocks associated with each node of a distributed system, each node must piggyback a timestamp in every message it sends to another node. With reference to FIG. 2, when a node is about to send a message to another node, the former node reads a timestamp from the associated clock (step 210) and piggybacks the timestamp to the message (step 220). At this point, the message may be sent to the other node (step 230).

When a message, containing a piggyback timestamp $TS_2$, is received by a node (step 310), the node performs the steps shown in FIG. 3. First, the node inspects the clock associated with the node to determine a local time $TS_1$ (step 320). Then, the node compares $TS_1$ and $TS_2$ (step 330). If $TS_2$ indicates a more recent time than $TS_1$ (step 340), then execution proceeds to step 350, otherwise the process terminates. In step 350, the node sets the time of its clock to be at least that of the timestamp. A simple way is to set the clock to a time equal to the timestamp.

This Lamport approach does not, however, indicate which causally unconnected events happen before the other. For example, if event A on node A did not cause event B on node B, and event B on node B did not cause event A on node A, then the timestamps assigned to events A and B by nodes A and B, respectively, will not necessarily reflect the actual sequence of events A and B.

To reflect the sequence of causally unrelated events, a total ordering is necessary. Any one set of total orderings can easily be derived from a partial ordering through simple arbitrary rules, such as granting certain nodes automatic priority for causally unconnected events. Although any derivable total ordering is sufficient to maintain the consistency of the concurrent database, users may have their own ideas about which casually unconnected event occurs before another. When they disagree, anomalous behavior results. This is a problem for multi-version databases.

A multi-version database is a database that manages concurrency control via versions and snapshots. A multi-version database stamps each version of data with a logical timestamp. When a process initiates a transaction to read an item of data from a multi-version database, the process generally does not obtain a lock to prevent other processes from concurrently modifying the data. Instead, the process reads a snapshot of the data at a particular point in time, determined by a timestamp generated at the beginning of the transaction. Consequently, the process might read information that is slightly older than the most current version, but the information is guaranteed to be consistent.

For example, consider a distributed database using Lamport's technique that implements a checking account. Suppose a husband makes a deposit in the checking account at his node and telephones his wife that the money is there. She then queries the checking account at her node to see how much money is there. As far as the database is concerned, these events are causally unconnected and it has no way of knowing that the snapshot time for the wife's transaction should be more recent than the timestamp for the husband's transaction. Technically, the husband's phone call to his wife violated a specification of Lamport's approach, because his telephone call to his wife did not piggyback a timestamp to the wife's node. If the snapshot time of the wife's balance inquiry is less recent than the timestamp of the husband's deposit, she would then not see the money deposited into the account, even though her husband had deposited it earlier in real time and told her about it. It is clearly desirable to reduce the amount of this kind of anomalous behavior in a database system.

Lamport recognized this problem and proposed to address it by mandating that every node keep a sufficiently accurate physical clock. This scheme is difficult to implement for database systems, because physical clocks are not reliable. Physical clocks run at different rates, they may be changed by an external user, and they require periodic resynchronization.

Another drawback with Lamport's method is that it is not fault-tolerant. In a multi-node parallel database, different nodes may share data stored on a non-volatile memory, such as a disk. Thus the disk becomes another medium in which anomalous behavior may occur. Typically, multiple nodes synchronize their write operations to disk with distributed locks. A node writing to a block of data to disk obtains an exclusive lock for the disk block, while a node reading a disk block obtains shared lock. Thus one can respect the causalities propagated via the disk by piggybacking timestamps in the lock messages according to the Lamport technique. However, this scheme only works if all nodes are alive. When a node dies, it may have advanced its local time way ahead of others and wrote that timestamp to disk. But this high local timestamp cannot be piggybacked to other nodes to propagate the causality. Consequently, when other surviving nodes read the data on disk (e.g., as part of recovery), it may unexpectedly encounter data in the future of its local time, violating causality that the Lamport technique guarantees.

SUMMARY OF THE INVENTION

In accordance with one aspect of the invention, a method of clock synchronization causes each node of a multi-node parallel database system within a prescribed period of time to transmit a message containing a timestamp of the logical clock associated with the node. The method also causes each node within the prescribed period of time to receive another message containing a timestamp of the logical clock associated with the node that transmitted the message. When a node receives a message, the node extracts the timestamp from the message and compares the timestamp with the logical clock associated with the node. If the time indicated by the timestamp is more recent than the time of the logical clock, then the node sets the logical clock to be at least as recent as the time indicated by the timestamp.

In another aspect of the invention, the method causes each node to maintain a watermark that represents a time at least as recent as the most recent time of the logical clocks in the multi-node parallel database system. When a node detects that the associated logical clock is nearing the watermark, the node causes all nodes to increase the watermark. When a crashed node is detected, the node performing the recovery of the crashed node sets the logical clock associated with the recovery node to be at least as recent as the watermark.

In accordance with another aspect of the invention, a database system comprises a plurality of nodes. Each node is associated with a logical clock and is configure to transmit a message containing a timestamp of the associated logical clock. Each node is also configured to receive another message containing another timestamp. In response to receiving the other timestamp, each node is configured to inspect the associated logical clock and set the logical clock to indicate a time as recent as the other timestamp. In another aspect, the database system comprises a central node which receives a message from every other node and sends a message to every other node.

In accordance with still another aspect of the invention, a computer readable medium has a sequence of instructions stored upon it for maintaining a logical clock of a node in a multi-node parallel database system. The sequence of instructions directs the node to maintain a watermark that represents a time at least as recent as the latest time represented by any of the logical clocks associated with other nodes in the multi-node parallel database system. The sequence of instructions also directs a node to increase the associated logical clock when the time represented by the logical clock is within a predetermined threshold of time. In addition, a node is directed to detect failure in one of the nodes in the system and, in response, cause a recovery node to set its associated logical clock to reflect a time at least as recent as the time indicated by the watermark and to recover the node that failed.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for assigning a sequence to events within a multi-node parallel database system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
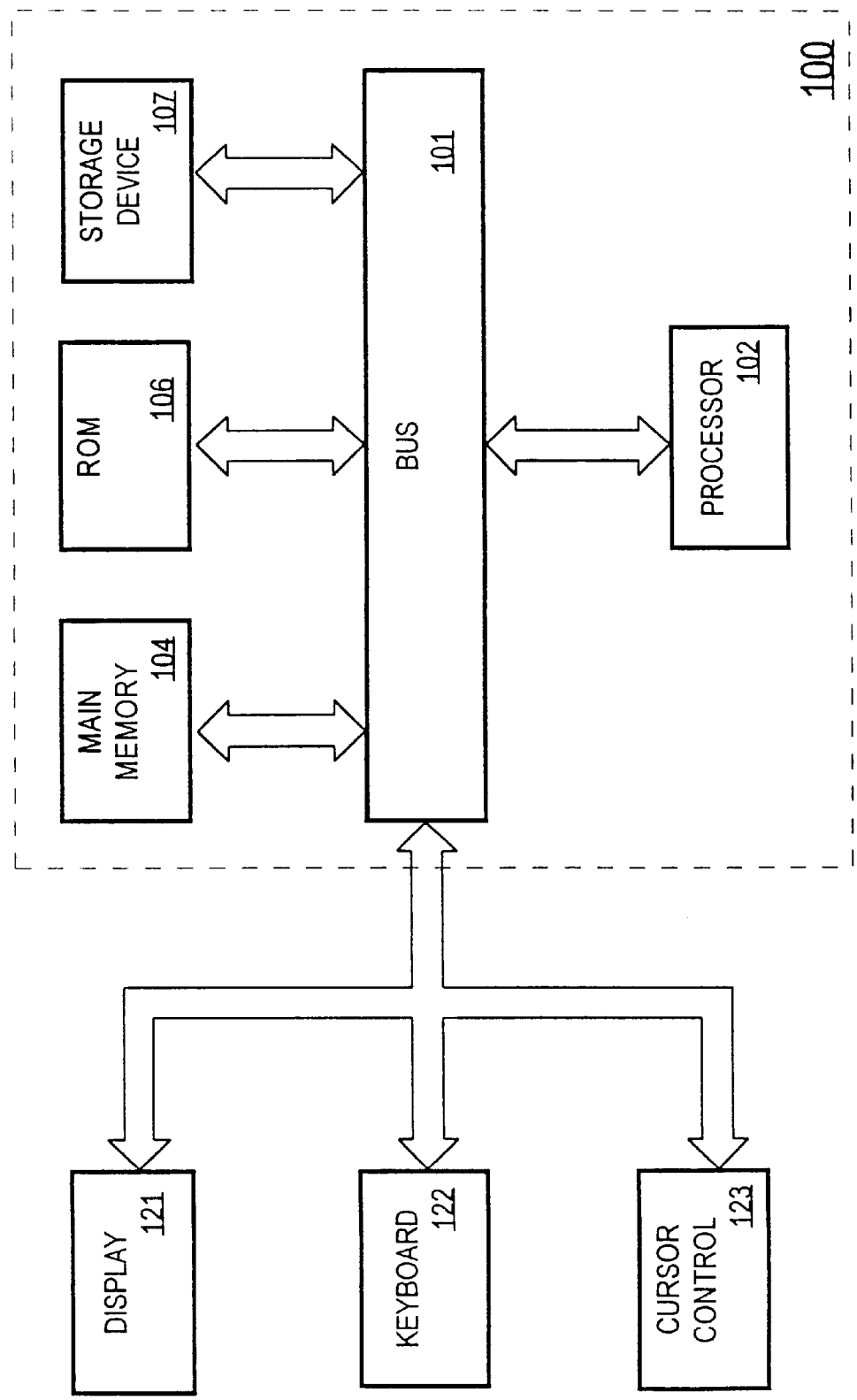
FIG. 1 is a high-level block diagram of a computer system.
Figure 2:
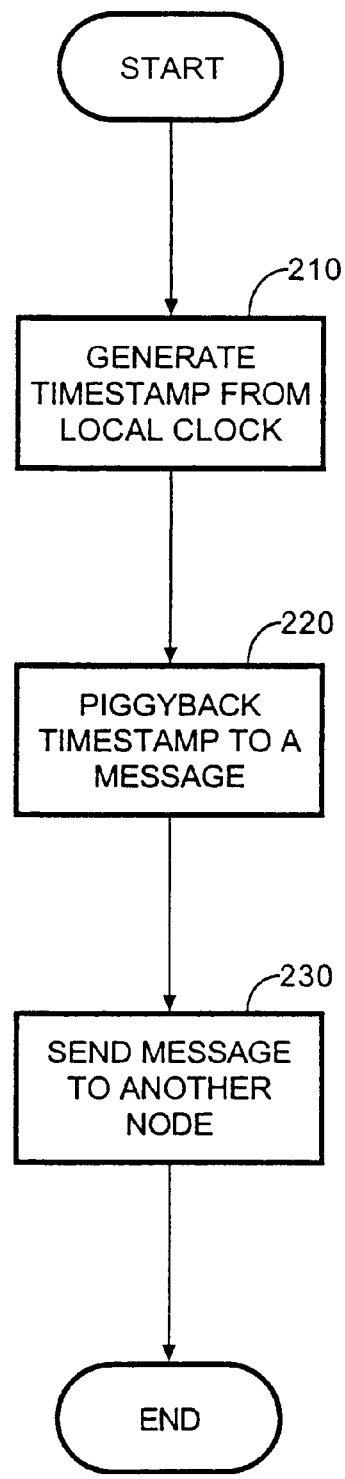
FIG. 2 is a flow chart depicting the clock synchronization steps a node performs in sending a message.
Figure 3:
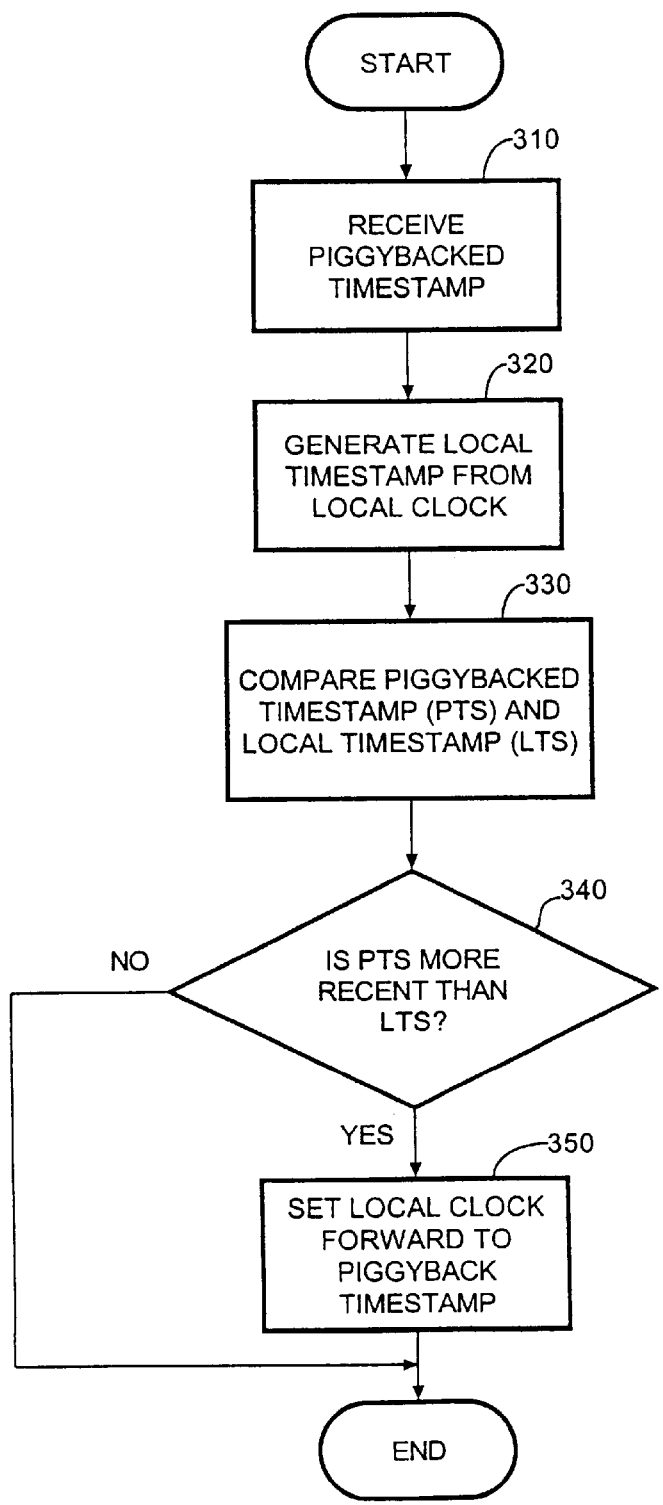
FIG. 3 is a flow chart depicting the clock synchronization steps a node performs in receiving a message.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to assign a sequence of events in a multi-node parallel database. According to one embodiment, assigning a sequences of events in a multi-node parallel database is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

MAINTAINING LOGICAL CLOCKS

According to one embodiment of the invention, each node in a multi-node parallel database computer system maintains a logical clock independent from its physical clock. The nodes are then configured to send messages that piggyback timestamps from their logical clocks in a way that ensures that a message with a timestamp from the most recent logical clock reaches every other node within a prescribed period.

Upon receiving the message that contains the timestamp of the most recent logical clock, each node synchronizes its own logical clock to the timestamp. For example, a node may perform the synchronization by determining whether the timestamp contained in the message represents a time more recent than the time represented on the logical clock. If the time represented in the timestamp in the message represents a time that is more recent than the time represented on the logical clock, then the node sets the logical clock to a value that represents a time at least as recent as the time represented in the timestamp contained in the message.

Because the timestamp of the most recent logical clock reaches every node within the prescribed period, anomalous behavior cannot occur outside the prescribed period of time because each node will synchronize to the fastest counting logical clock in the multi-node parallel database system within the period. Therefore, causally unconnected events occurring outside the prescribed period of time will be ordered according to the actual sequence of events.

In the example of the checking account, the husband makes a deposit in the checking account at his node and telephones his wife that the money is there. After the telephone conversions, she immediately queries the checking account at her node to see how much money is there. Although these events are causally unconnected as far as the multi-node parallel database is concerned, the telephone conversation will take some amount of time. If that amount of time is greater than the prescribed period of time, then the node that runs the wife's query, during that period, will be synchronized to the fastest counting logical clock in the multi-node parallel database system. Even if the husband's node at the time of deposit had the fastest running clock, the logical clock at the wife's node after the telephone call will represent a more recent time. As long as the prescribed period of time is set to a sufficiently small period of time, such as seven seconds, most causally unconnected events will be properly ordered.

REDUCING ANOMALOUS BEHAVIOR

One embodiment of the invention guarantees that a message with the most recent logical timestamp reaches every node within the prescribed period by requiring every node to communicate in a round-robin fashion with every other node in the system. Since one of those nodes has the fastest running logical clock, every other node will receive a timestamp from the fastest running logical clock and synchronize to it. However, such a requirement exhibits an expensive, quadratic growth pattern in the number of required messages in the multi-node parallel database system.

Consequently, in another, preferred embodiment of the invention, the number of messages that must be transmitted within the system is reduced to a linear growth pattern by designating one node as a central node in the multi-node parallel database system. Within each prescribed period, the central node sends a message to every other node in the multi-node parallel database system, and each of the other nodes sends a message to that central node. Thus, a message from the node with the most recent time will force the central node to the most recent time, and messages sent from the central node after the central node has received that message will subsequently force all the other nodes to the most recent time.

Figure 4:
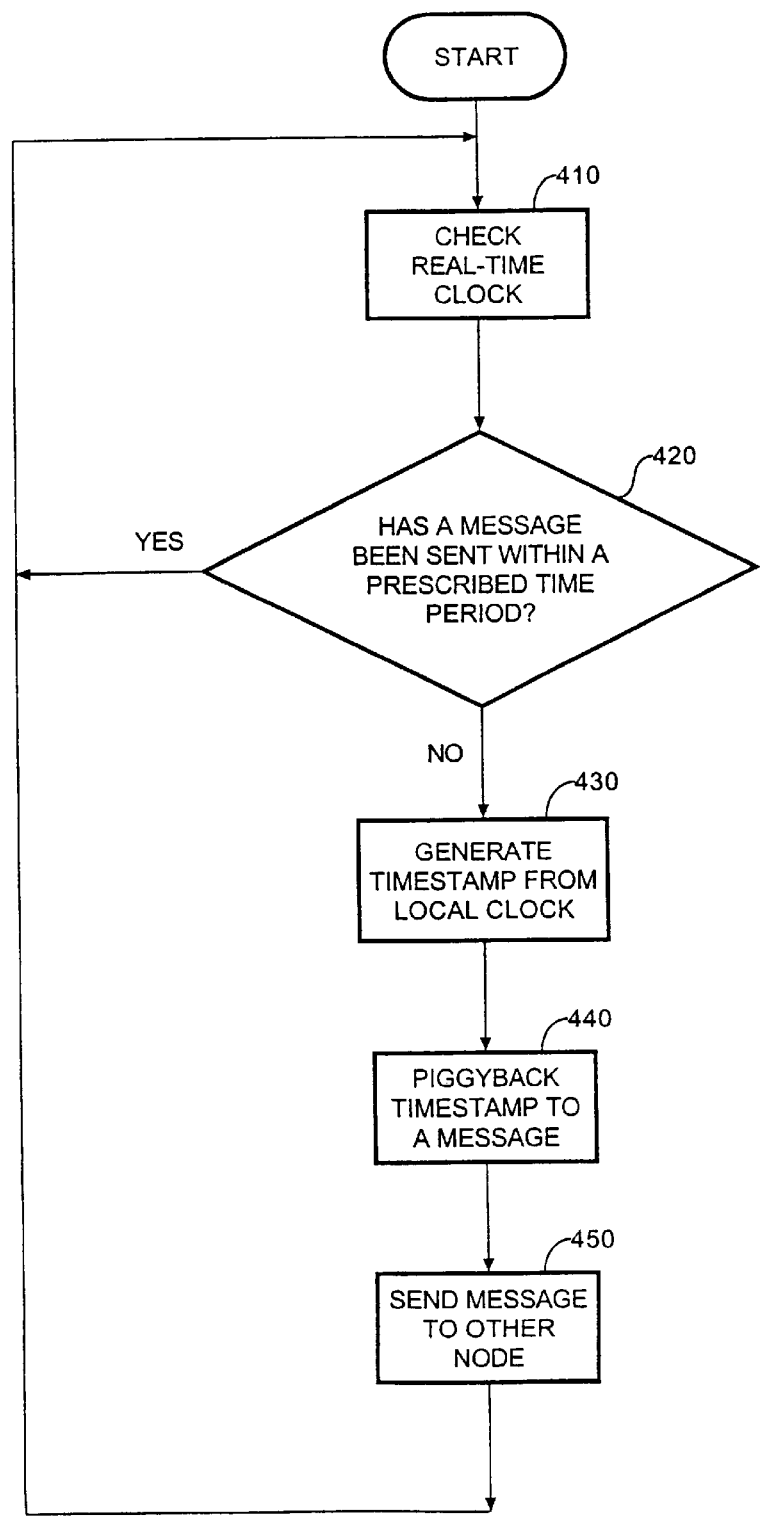
FIG. 4 is a flow chart depicting the periodic steps of the first embodiment of the present invention.

The operation of a node in an multi-node parallel database computer system that employs an embodiment of the invention is shown in the flowchart of FIG. 4. Referring to FIG. 4, the node checks a real-time clock, a standard component of a computer system, to see if it has sent a message to the central node in the prescribed period of time (step 410). This checking may be achieved by polling the clock or waiting for a timer interrupt from the system clock.

If the prescribed period is about to elapse and node has not sent a message to the central node within the prescribed period of time (step 420), then the node executes step 430, reading a timestamp from the logical clock associated with the node; step 440, piggybacking the timestamp to a message; and step 450, sending the message to the central node. After the message has been sent, execution of the process returns to step 410.

Determining the actual length of the prescribed period must be done on a case-by-case basis, because it involves making a trade-off between the acceptable efficiency of the multi-node parallel database system and the amount of tolerable anomalous behavior. Minimizing the length of the prescribed period reduces the amount of anomalous behavior, but impairs the system efficiency. On the other hand, increasing the length of the prescribed period improves the system efficiency but allows more anomalous behavior. As a result, the prescribed period is preferably determined on an individual basis by a tunable parameter for the multi-node parallel database system.

By using the standard real-time clock distinct from the logical clock, this invention obtains two advantages over Lamport's approach in reducing anomalous behavior. First, the logical clock is continually resynchronized instead of the standard clock, allowing the standard clock to be used for its intended purposes. Second, implementing the logical clock as a software counter is now feasible, because the standard clock, not the logical clock, is used to determine the prescribed period with sufficient accuracy.

FAULT-TOLERANT TIMESTAMP GENERATION

Figure 5:
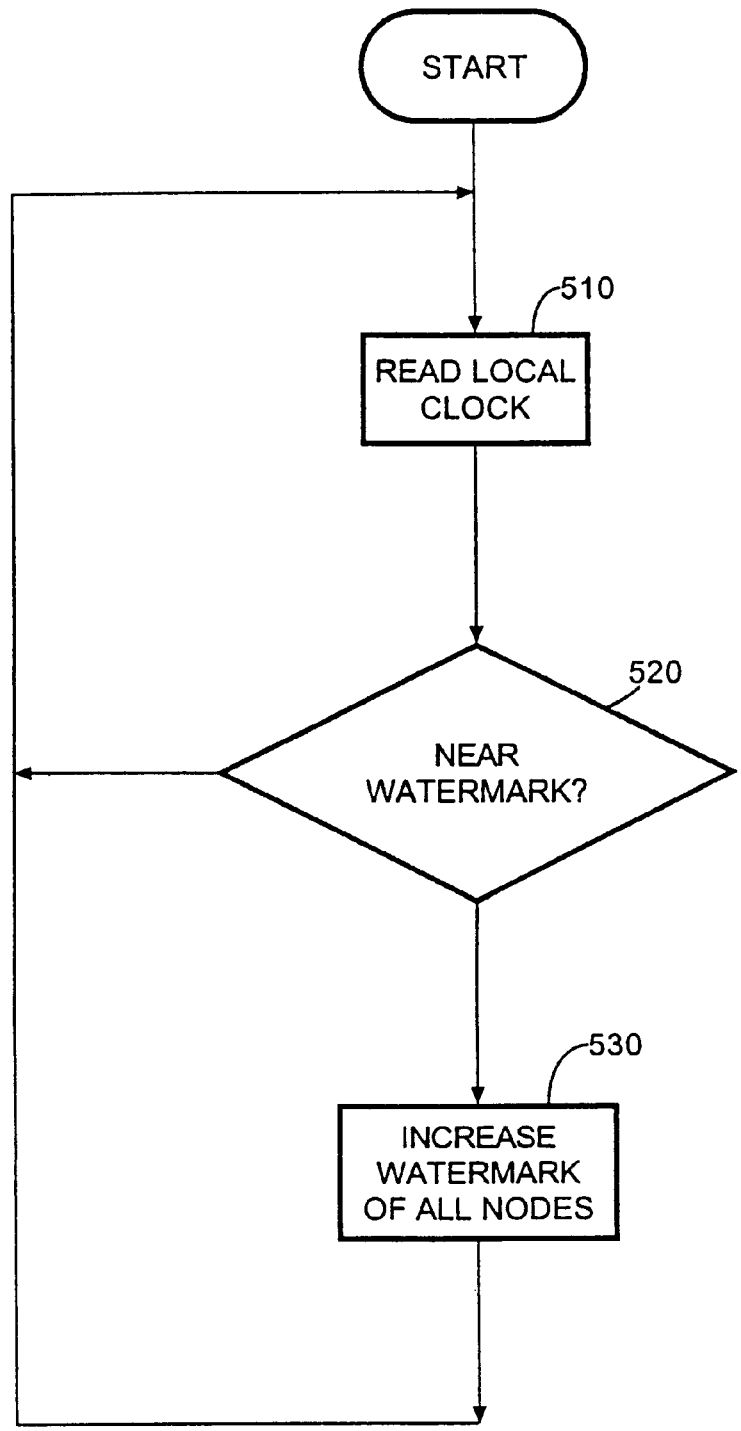
FIG. 5 is a flow chart depicting the periodic steps of the second embodiment of the present invention.

Another aspect of the invention facilitates the recovery of a crashed node in a fault-tolerant multi-node parallel database system. Every node maintains a watermark which indicates a time value later than any logical clock in the system to ensure that a node recovering the actions of the crashed node has a logical clock representing a later time than that of the crashed node. With reference to the flowchart of FIG. 5, a node in step 510 reads a timestamp from an associated logical clock. Then, the node checks the timestamp against a watermark associated with and maintained by the node (step 520). If the timestamp is sufficiently near the watermark, determined with respect to a threshold value, then the node in step 530 forces itself and all other nodes of the multi-node parallel database system to raise their watermarks by a prescribed increment. Finally, the process returns back to step 510. If the threshold value is small enough so that other nodes are likely to cross the watermark, then the method of forcing all other nodes to increase the watermark further includes the steps of stopping all other logical clocks, then increasing the watermark, then resuming the logical clocks.

Figure 6:
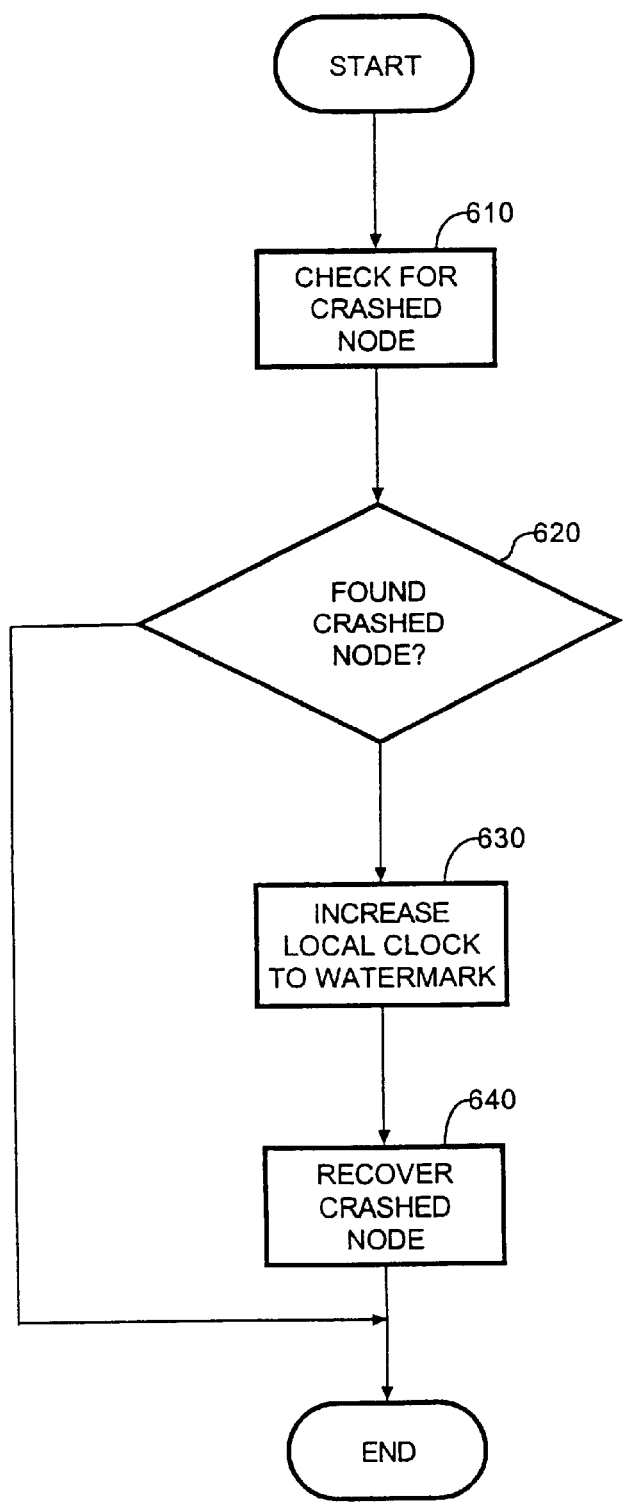
FIG. 6 is a flow chart depicting the recovery steps of the second embodiment.

In this manner, the maintained watermark indicates a timestamp value that is greater than or equal to any timestamp presently generated in the multi-node parallel database system. This invariant facilitates instant recovery of a crashed node as described in the flowchart of FIG. 6. In step 610, a node in a fault-tolerant multi-node parallel database system checks for a crashed node. If a crashed node is found (step 620), then a recovery node is directed to execute the following steps. First, the recovery node sets the associated logical clock to be at least as recent as the time reflected in the watermark (step 630). Then, the recovery node performs the normal recovery operation upon the crashed node (step 640).

As a result, the recovery node has a logical clock that is guaranteed to be later than the logical clock of the crashed node. According to one embodiment of the invention, the recovery node determines a guaranteed later time in a constant time operation of reading the watermark, instead of the linear time operation of scanning the entire recovery log of the crashed node. Moreover, maintaining a watermark in this manner works even if certain changes to the database are not logged in the recovery log.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for maintaining logical clocks in a multi-node parallel database system that includes a plurality of nodes, wherein each node of said plurality of nodes is associated with a logical clock, the method comprising the computer-implemented steps of:

causing each node of said plurality of nodes to maintain a watermark that represents a time at least as recent as the latest time represented by the logical clocks on each of said plurality of nodes; and when the time represented on a logical clock of a node of said plurality of nodes is within a predetermined threshold of the time represented by said watermark, then causing all nodes of said plurality of nodes to increase said watermark.

2. The method of claim 1, further comprising the steps of:

causing all nodes of said plurality of nodes to stop the logical clock associated with said node, before the step of causing all nodes of said plurality of nodes to increase said watermark; and causing all nodes of said plurality of nodes to resume the logical clock associated with said node, after the step of causing all nodes of said plurality of nodes to increase said watermark.

3. The method of claim 1 further comprising the steps of causing each node of said plurality of nodes to perform the following steps:

transmitting a first message that contains a first message timestamp representing time indicated by the logical clock associated with said node to another node of said plurality of nodes;

receiving a second message from another node of said plurality of nodes, wherein said second message contains a second message timestamp; and in response to receiving said second message, performing the steps of:

inspecting the logical clock associated with the node to determine a time indicated by said logical clock, comparing the time indicated by said logical clock with a time indicated by the second message timestamp, and if the time indicated by the second message timestamp is more recent than the time indicated by the logical clock, then setting the logical clock associated with the node to reflect a time that is at least as recent as the time reflected in the message timestamp.

4. The method of claim 1, further comprising the steps of:

detecting failure of one of said plurality of nodes; and in response to detecting failure of said one of said plurality of nodes, causing a recovery node to perform the steps of:

setting the logical clock associated with the recovery node to reflect a time that is at least as recent as the time reflected in the watermark and after setting the logical clock, causing said recovery node to recover the node that failed.

5. A method for maintaining logical clocks in a distributed system that includes a plurality of nodes, wherein each node of said plurality of nodes is associated with a logical clock, the method comprising the computer-implemented step of:

causing each node of said plurality of nodes to perform the following steps within each of a plurality of successive periods having a common prescribed duration:

(a) transmitting a first message that contains a first message timestamp representing time indicated by the logical clock associated with said node to another node of said plurality of nodes;

(b) receiving a second message from another node of said plurality of nodes, wherein said second message contains a second message timestamp; and (c) causing the logical clock associated with said node to reflect a time at least as recent as the time in the second message timestamp;

wherein the step of causing the logical clock associated with said node to reflect a time at least as recent as the time in the second message timestamp includes the steps of:

inspecting the logical clock associated with the node to determine a time indicated by said logical clock, comparing the time indicated by said logical clock with a time indicated by the second message timestamp, and if the time indicated by the second message timestamp is more recent than the time indicated by the logical clock, then setting the logical clock associated with the node to reflect a time that is at least as recent as the time reflected in the second message timestamp.

6. The method of claim 5, further comprising the steps of:

causing a central node of said plurality of nodes to transmit a first message timestamp representing time indicated by the logical clock associated with said central node to each other node of said plurality of nodes and causing each other node of said plurality of nodes to transmit a first message timestamp representing time indicated by the logical clock associated with said node to said central node.

7. The method of claim 5, further comprising the steps of:

causing each node of said plurality of nodes to maintain a watermark that represents a time at least as recent as the latest time represented by the logical clocks on each of said plurality of nodes;

when the time represented on a logical clock of a node of said plurality of nodes is within a predetermined threshold of the time represented by said watermark, then causing all nodes of said plurality of nodes to increase said watermark;

detecting failure of one of said plurality of nodes; and in response to detecting failure of said one of said plurality of nodes, causing a recovery node to perform the steps of:

setting the logical clock associated with the recovery node to reflect a time that is at least as recent as the time reflected in the watermark and after setting the logical clock, causing said recovery node to recover the node that failed.

8. The method of claim 7, further comprising the steps of:

causing all nodes of said plurality of nodes to stop the logical clock associated with said node, before the step of causing all nodes of said plurality of nodes to increase said watermark and causing all nodes of said plurality of nodes to resume the logical clock associated with said node, after the step of causing all nodes of said plurality of nodes to increase said watermark.

9. A multi-node parallel database clock control system, comprising:

a plurality of nodes, wherein each node of said plurality of nodes is associated with a logical clock;

wherein each node of said plurality of nodes is configured to maintain a watermark that represents a time at least as recent as the latest time represented by the logical clocks on each of said plurality of nodes;

wherein a watermark node of said plurality of nodes is to configured to cause all nodes of said plurality of nodes to increase said watermark, when the time represented on a logical clock of said watermark node of said plurality of nodes is within a predetermined threshold of the time represented by said watermark.

10. The multi-node parallel database clock control system of claim 9 wherein:

each node of said plurality of nodes is configured to transmit a first message that contains a first message timestamp representing time indicated by the logical clock associated with said node to another node of said plurality of nodes and each node of said plurality of nodes is configured to a second message from another node of said plurality of nodes, wherein said second message contains a second message timestamp, and in response to receiving said second message, to perform the steps of:

inspecting the logical clock associated with the node to determine a time indicated by said logical clock, comparing the time indicated by said logical clock with a time indicated by the second message timestamp, and if the time indicated by the second message timestamp is more recent than the time indicated by the logical clock, then setting the logical clock associated with the node to reflect a time that is at least as recent as the time reflected in the message timestamp.

11. The multi-node parallel database clock control system of claim 9, wherein a detecting node of said plurality of nodes is configured to detect failure of one of said plurality of nodes and, in response to detecting failure of said one of said plurality of nodes, to cause a recovery node to perform the steps of:

setting the logical clock associated with the recovery node to reflect a time that is at least as recent as the time reflected in the watermark and after setting the logical clock, causing said recovery node to recover the node that failed.

12. A distributed clock synchronizing system comprising:

a plurality of nodes, wherein each node of said plurality of nodes is associated with a logical clock;

wherein each node of said plurality of nodes is configured to perform the following steps within each of a plurality of successive periods having a common prescribed duration:

(a) transmitting a first message that contains a first message timestamp representing time indicated by the logical clock associated with said node to another node of said plurality of nodes;

(b) receiving a second message from another node of said plurality of nodes, wherein said second message contains a second message timestamp, and (c) causing the logical clock associated with the node to reflect a time that is at least as recent as the time reflected in the second message timestamp;

wherein the step of causing the logical clock associated with said node to reflect a time at least as recent as the time in the second message timestamp includes the steps of:

inspecting the logical clock associated with the node to determine a time indicated by said logical clock, comparing the time indicated by said logical clock with a time indicated by the second message timestamp, and if the time indicated by the second message timestamp is more recent than the time indicated by the logical clock, then setting the logical clock associated with the node to reflect a time that is at least as recent as the time reflected in the second message timestamp.

13. The system of claim 12, said plurality of nodes further comprising:

a central node, configured to transmit a first message timestamp representing time indicated by the logical clock associated with said central node to each other node of said plurality of nodes;

wherein each other node of said plurality of nodes is configured to transmit a first message timestamp representing time indicated by the logical clock associated with said node to said central node.

14. A computer readable medium having stored thereon sequences of instructions for maintaining a logical clock of a node in a multi-node parallel database system of a plurality of nodes, said sequences of instructions including instructions for performing the steps of:

maintaining a watermark that represents a time at least as recent as the latest time represented by the logical clocks on each of said plurality of nodes;

when the time represented on said logical clock is within a predetermined threshold of the time represented by said watermark, then increasing said watermark.

15. The computer readable medium of claim 14, wherein said sequence of instructions further includes instructions for performing the steps of:

stopping said logical clock before the step of causing said node to increase said watermark; and resuming said logical clock, after the step of causing said node to increase said watermark.

16. The computer readable medium of claim 14, wherein said sequence of instructions further includes instructions for performing the steps of:

transmitting a first message that contains a first message timestamp representing time indicated by said logical clock;

receiving a second message from another node of said plurality of nodes, wherein said second message contains a second message timestamp; and in response to receiving said second message, performing the steps of:

inspecting said logical clock to determine a time indicated by said logical clock, comparing the time indicated by said logical clock with a time indicated by the second message timestamp, and if the time indicated by the second message timestamp is more recent than the time indicated by said logical clock, then setting said logical clock to reflect a time that is at least as recent as the time reflected in the message timestamp.

17. The computer readable medium of claim 14, wherein said sequences of instructions further include instructions for performing the steps of:

detecting failure of one of said plurality of nodes; and in response to detecting failure of said one of said plurality of nodes, causing a recovery node to perform the steps of:

setting the logical clock associated with the recovery node to reflect a time that is at least as recent as the time reflected in the watermark and after setting the logical clock, causing said recovery node to recover the node that failed.

18. A computer readable medium having stored thereon sequences of instructions for maintaining a logical clock of a node in a distributed system of a plurality of nodes, wherein each node of said plurality of nodes is associated with a logical clock, said sequences of instructions including instructions for performing the step of:

causing said node to perform the following steps within each of a plurality of successive periods having a common prescribed duration:

(a) transmitting a first message that contains a first message timestamp representing time indicated by said logical clock to another node of said plurality of nodes;

(b) receiving a second message from another node of said plurality of nodes, wherein said second message contains a second message timestamp; and (c) causing the logical clock associated with said node to reflect a time at least as recent as the time in the second message timestamp;

wherein the step of causing the logical clock associated with said node to reflect a time at least as recent as the time in the second message timestamp includes the steps of:

inspecting the logical clock associated with the node to determine a time indicated by said logical clock, comparing the time indicated by said logical clock with a time indicated by the second message timestamp, and if the time indicated by the second message timestamp is more recent than the time indicated by the logical clock, then setting the logical clock associated with the node to reflect a time that is at least as recent as the time reflected in the second message timestamp.

19. The computer readable medium of claim 18, wherein said sequence of instructions further includes instructions for performing the step of transmitting a first message timestamp representing time indicated by said logical clock to every other node of said plurality of nodes.

20. The computer readable medium of claim 18, wherein said sequence of instructions further includes instructions for performing the step of transmitting a first message timestamp representing time indicated by said logical clock to a central node.

21. The computer readable medium of claim 18, wherein said sequence of instructions further includes instructions for performing the steps of:

maintaining a watermark that represents a time at least as recent as the latest time represented by the logical clocks on each of said plurality of nodes;

when the time represented on said logical clock is within a predetermined threshold of the time represented by said watermark, then increasing said watermark;

detecting failure of one of said plurality of nodes; and in response to detecting failure of said one of said plurality of nodes, causing a recovery node to perform the steps of:

setting the logical clock associated with the recovery node to reflect a time that is at least as recent as the time reflected in said watermark and after setting the logical clock, causing said recovery node to recover the node that failed.

22. The computer readable medium of claim 21, wherein said sequence of instructions further includes instructions for performing the steps of:

stopping said logical clock before the step of increasing said watermark and resuming said logical clock after the step of increasing said watermark.

* * * * *